United States Patent [19]

Azegami et al.

[11] Patent Number: 4,693,378

[45] Date of Patent: Sep. 15, 1987

[54] METHOD AND APPARATUS FOR SORTING ARTICLES

[75] Inventors: Osamu Azegami, Fuchu; Toshifumi Miyake, Ohtsu, both of Japan

[73] Assignees: Kabushiki Kaisha Ishida Koki, Kyoto; Yac Co., Limited, Akishama, both of Japan

[21] Appl. No.: 779,619

[22] Filed: Sep. 25, 1985

Related U.S. Application Data

[63] Continuation of Ser. No. 474,334, Mar. 11, 1983, abandoned.

[30] Foreign Application Priority Data

| | | | |
|---|---|---|---|
| Mar. 13, 1982 | [JP] | Japan | 57-40069 |
| Mar. 13, 1982 | [JP] | Japan | 57-40070 |
| Mar. 13, 1982 | [JP] | Japan | 57-40071 |
| Mar. 13, 1982 | [JP] | Japan | 57-39981 |
| Mar. 13, 1982 | [JP] | Japan | 57-39982 |

[51] Int. Cl.[4] .......... B07C 5/10; G01B 11/28; H04N 7/02

[52] U.S. Cl. .......... 209/586; 209/939; 356/379; 358/107; 364/564; 382/28

[58] Field of Search .......... 209/558, 564–566, 209/586, 587, 912, 939; 356/379, 380, 383; 358/107; 382/1, 25, 28, 44, 47, 61, 63; 414/134, 136; 364/560, 564

[56] References Cited

U.S. PATENT DOCUMENTS

| | | | |
|---|---|---|---|
| 2,803,406 | 8/1957 | Nuttall | 358/107 X |
| 2,891,722 | 6/1959 | Nuttall et al. | 358/107 X |
| 3,373,870 | 3/1968 | Black et al. | 209/565 |
| 3,578,904 | 5/1971 | Dewey et al. | 358/107 X |
| 3,768,645 | 10/1973 | Conway et al. | 209/912 X |
| 3,786,939 | 1/1974 | Habegger et al. | 414/136 X |
| 4,132,314 | 1/1979 | von Beckmann et al. | 209/565 |
| 4,152,767 | 5/1979 | Laliotis | 364/560 |
| 4,156,231 | 5/1979 | Edamatsu et al. | 364/564 X |
| 4,246,098 | 1/1981 | Conway et al. | 209/587 X |
| 4,271,967 | 6/1981 | Matsuo et al. | 209/558 |
| 4,308,959 | 1/1982 | Hoover et al. | 209/587 X |
| 4,400,728 | 8/1983 | Long | 358/107 |

FOREIGN PATENT DOCUMENTS

| | | | |
|---|---|---|---|
| 2937335 | 5/1980 | Fed. Rep. of Germany . | |
| 3012559 | 10/1980 | Fed. Rep. of Germany . | |
| 8002517 | 11/1980 | PCT Int'l Appl. . | |
| 0946616 | 1/1964 | United Kingdom | 209/565 |

*Primary Examiner*—Robert B. Reeves
*Assistant Examiner*—Edward M. Wacyra
*Attorney, Agent, or Firm*—Staas & Halsey

[57] ABSTRACT

An automatic article sorting apparatus sorts out articles by their sizes. The apparatus includes a conveyor mechanism for conveying the articles, and an image pickup unit for producing images of the articles as they are conveyed by the conveyor mechanism. An image memory stores the images of the articles one frame at a time, and a sorting device masks an unnecessary portion of the image of an article. The size of the article is derived from the number of pixels in the unmasked portion of the image of the article, and the size of the article is compared with a preset range of grades to produce selection information. A sorting apparatus sorts out the article in accordance with the selection information.

1 Claim, 21 Drawing Figures

METHOD AND APPARATUS FOR SORTING ARTICLES

This is a continuation of co-pending application Ser. No. 474,334 filed on Mar. 11, 1983, now abandoned.

BACKGROUND OF THE INVENTION

The present invention relates to a method of and an apparatus for automatically sorting articles, and more particularly to a method of and an apparatus for automatically sorting vegetables, such as potatoes and tomatoes and fruits, such as apples and pears by their sizes.

Vegetables and fruits are required to be sorted or classified into groups by their sizes since their qualities are evaluated according to size, and buying and selling prices are determined by the qualities thus rated. It has been conventional practice to establish a plurality of size grades in advance and to manually sort out randomly mixed vegetables or fruits that have been brought by producers according to the predetermined size grades. However, such a manual sorting process invites an increase in the cost as the personnel expenses run up, and cannot perform an efficient and uniform sorting operation.

There is known an apparatus for automatically sorting articles such as vegetables and fruits. In the known automatic sorting apparatus, there has been a demand for properly and simply setting article grades for sorting articles.

It is also necessary during article selection to quickly and accurately determine the area and number of articles as they flow along the sorting line for an efficient article sorting operation. Vegetables such as tomatoes and potatoes sometimes suffer from the deficiency of an irregular shape, and the irregularly shaped ones should be separated from the normally shaped ones before sale, since the badly shaped articles have a reduced market value.

SUMMARY OF THE INVENTION

It is an object of the present invention to provide an apparatus for automatically determining the sizes of vegetables and fruits to be sorted out and for sorting them by the sizes determined.

Another object of the present invention is to provide a method of accurately and simply setting grades for articles to be sorted in such an automatic sorting apparatus.

Still another object of the present invention is to provide a method of computing the area of an article held in a bucket while computing the number of articles.

A still further object of the present invention is to provide a number and area computing method capable of detecting two or more articles in a bucket as nonstandard articles and discharging them into an irregular shape or nonstandard article discharger.

A still further object of the present invention is to provide a method of discriminating and separating irregularly shaped articles from normally shaped articles.

According to the present invention, an automatic article sorting apparatus for sorting out articles by their sizes comprises a conveyor mechanism for conveying the articles; an image pickup unit for producing images of the articles as conveyed by the conveyor mechanism; an image memory for storing the images of the articles one frame at a time; a sorting device for masking an unnecessary portion of the image of an article, for deriving the size of the article from the number of pixels of an unmasked portion of the image of the article, and for comparing the size of the article with a preset range of grades to produce selection information; and means for sorting out the article according to the selection information.

Grades of article sizes are determined, the area and number of articles are computed, and the shape of the article to be sorted out is determined in the automatic article sorting apparatus.

The above and other objects, features and advantages of the present invention will become more apparent from the following description when taken in conjunction with the accompanying drawings in which a preferred embodiment of the present invention is shown by way of illustrative example.

DESCRIPTION OF THE PREFERRED EMBODIMENT

Figure 1:
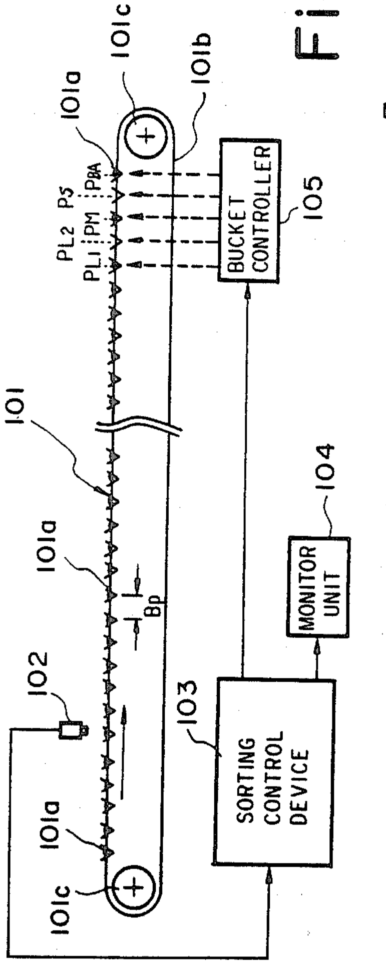
FIG. 1 is a schematic view, partly in block form, of an automatic article sorting system according to the present invention.
Figure 2:
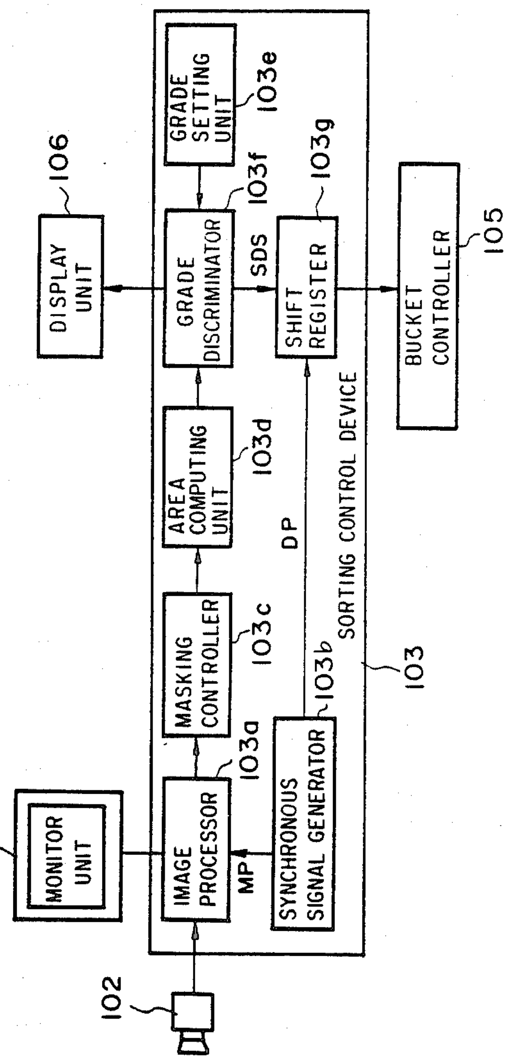
FIG. 2 is a block diagram showing the details of the sorting control device 103 in the automatic article sorting system shown in FIG. 1.

FIG. 1 schematically shows an automatic article sorting system, and FIG. 2 shows in block form a sorting control device. A conveyor mechanism 101 for transporting and sorting articles such as vegetables and fruits (hereinafter referred to as "articles"), is composed of a chain 101*b* having a multiplicity of buckets 101*a* and a pair of chain drive units 101*c* for driving the chain 101*b* to move the buckets 101*a*. The automatic article sorting system also includes an image pickup device or an industrial television camera (hereinafter referred to as an "ITV camera") 102 for picking up images of articles held in the buckets 101*a*, a sorting control device 103 for determining the size of an article as "extra-large", "large", "medium", "small", or "nonstandard" based on the image thereof sent from the ITV camera 102 and for issuing a selection signal indicative of the size determined, a monitor unit 104 for displaying the image supplied from the ITV camera 102, a bucket controller 105 for opening and closing specified buckets 101*a* based on selection signals from the sorting control device 103, and a display unit 106.

As shown in FIG. 1, the article sorting system has a plurality of discharge positions near one of the chain drive units 101*c* and spaced along the chain 101*b* for causing buckets to discharge differently sized articles. These discharge positions include a position PL1 for discharging "extra-large" articles, a position PL2 for discharging "large" articles, a position PM for discharging "medium" articles, a position PS for discharging "small" articles, and a position PBA for discharging irregularly shaped or "nonstandard" articles which cannot be treated as marketable items. For example, when an "extra-large" article is carried by a bucket 101*a* and reaches the position PL1, this bucket 101*a* is opened in response to a selection signal issued from the sorting control device 103 to discharge the "extra-large" article into an extra-large article discharger (not shown). Likewise, when "large", "medium", "small" and irregularly shaped or "nonstandard" articles arrive at the positions PL2, PM, PS and PBA, respectively, the buckets carrying these articles are opened to discharge the latter respectively into large, medium, small and irregularly shaped article dischargers (not illustrated).

As shown in FIG. 2, the sorting control device 103 comprises an image processer 103*a*, a synchronous signal generator 103*b*, a masking controller 103*c*, an area computing unit 103*d*, a grade setting unit 103*e* for setting a range of size grades, a grade discriminator 103*f* for determining the grade to which a particular article size belongs, and a shift register 103*g*.

Figure 3:
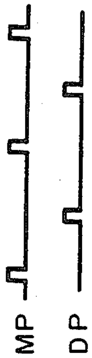
FIG. 3 is a diagram showing the waveform of synchronous pulses.

The image processor 103*a* functions to take in the image as picked up by the ITV camera 102 in synchronism with measurement synchronous pulses MP (described later) and has an A/D converter and a video image memory for storing an image per video frame. More specifically, the image processor 103*a* reads the one-frame image picked up by the ITV camera 102 as n x m picture elements or pixels, digitizes the black/white level of each pixel through analog-to-digital conversion while dividing the gray scale into four steps, and stores the black/white level of each pixel at a given address in the video image memory. The synchronous signal generator 103*b* produces measurement synchronous pulses MP (FIG. 3) in synchronism with movement of the buckets 101*a* through one bucket pitch Bp (FIG. 1), and sorting synchronous pulses DP which are slightly delayed after the measurement synchronous pulses MP.

The masking controller 103*c* is capable of masking an unwanted portion of the video frame picked up by the ITV camera 102 and stored in the video image memory, and of controlling the position of the masked portion.

FIGS. 4 through 7 are explanatory of masking control. In the automatic article sorting system of the invention, the area of an article imaged by the ITV 102 is measured and the grade of the article is determined dependent on the measured area, as will be described below. The area of the article is determined by the number of pixels covered by the article. Whether one of a number of pixels belongs to the article or not is determined by ascertaining if the black/white level of that pixel is a black level or not.

Figure 4:
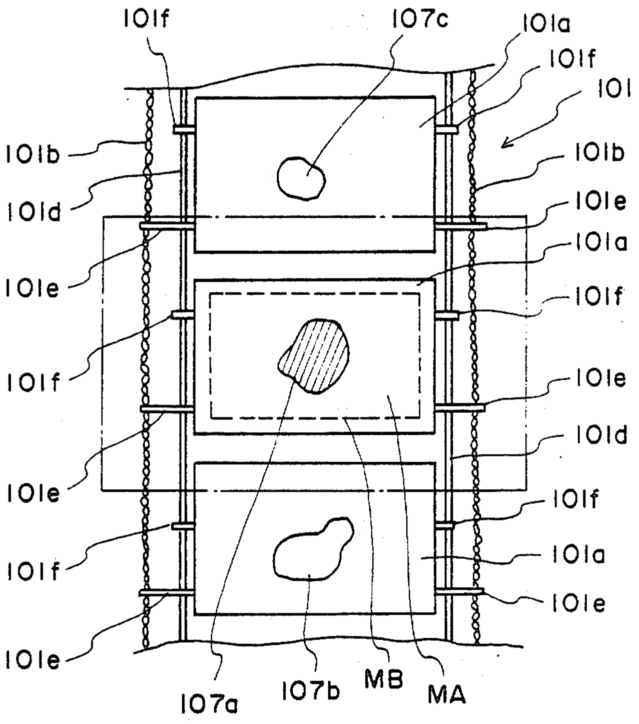
FIGS. 4 through 7 are schematic views for describing masking control.
Figure 5:
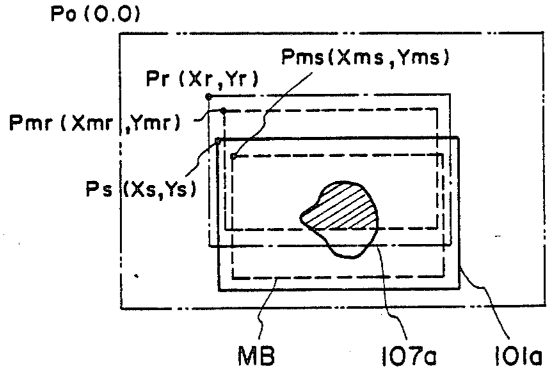

As shown in FIG. 4, one video frame (enclosed by the dot-and-dash line) of the ITV camera 102 contains, as a picked-up image, one bucket 101*a*, portions of the buckets 101*a* in front of and behind the central bucket 101*a*, the chains 101*b*, rails 101*d* for guiding the buckets 101*a*, hooks 101*e*, each having one end fixed to the chain 101*b* and the other end fixed to the bucket 101*a*, and sliders 101*f* each having one end secured to the bucket 101*a* and the other end slidable on and along the rail 101*d*. The image in this video frame is stored in the video image memory. Since the video image memory stores black levels other than those corresponding to an article 107*a*, no correct article area can be computed simply by counting the black levels of all pixels stored in the video image memory. To avoid this problem, the present invention establishes a mask boundary line MB (indicated by the dotted line in FIG. 4) enclosing an area slightly smaller than that of the bucket 101*a*, for thereby precluding black-level pixels other than those corresponding to the article. As a result, an unmasked portion MA does not indicate black levels other than the article. By letting the total number of pixels in the unmasked portion be Pe and the number of black levels on the article 107*a* be Be, the size of the article 107*a* can be expressed as a proportion SQR thereof to the total pixel number Pe by:

$$SQR = \frac{Be}{Pe} \times 100\ (\%) \qquad (1)$$

If successively transported buckets 101*a* were imaged by the ITV camera 102 at a constant position in the video frame at all times, there would be no need for correcting the masking position. However, buckets tend to be imaged at different positions in the video frame due to positioning errors of buckets, variations in timing at which video frames are picked up, and other factors. Accordingly, a corrective action is required to rectify the masking position. More specifically, designated in FIG. 5 at Po (0, 0) is a reference point, at Pr (Xr, Yr) a reference position for an upper left corner of a bucket, stored in the mask controller 103*c*, and at Pmr (Xmr, Ymr) a reference position for an upper left corner of a mask boundary line, stored in the mask controller 103*c*. It is now assumed that a bucket 101*a* and an article 107*a* are imaged at solid-line positions illustrated in FIG. 5. Under this condition, unless the position of the mask boundary line is corrected, only a portion (shown hatched in FIG. 5) of the article 107*a* will be interpreted as the entire size of the article 107*a*. Therefore, it is necessary to correct the mask boundary position dependent on the position in which the bucket 101*a* is imaged. On the assumption that an upper left corner Ps of the actual image of the bucket 101*a* has coordinates (Xs, Ys), the coordinates (Xms, Yms) of an upper left corner Pms of a corrected mask boundary line MB can be given respectively by:

$$Xms = Xmr + (Xs - Xr) \qquad (2)$$

$$Yms = Ymr + (Ys - Yr) \qquad (3)$$

Therefore, a difference between the position of the imaged bucket 101*a* and the reference position therefor is first determined, and then an actual mask boundary position is found by effecting arithmetic operations based on the equations (2) and (3).

Figure 6:
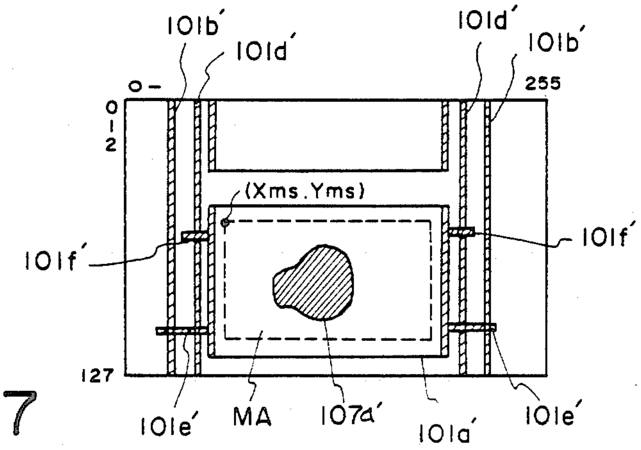
Figure 7:
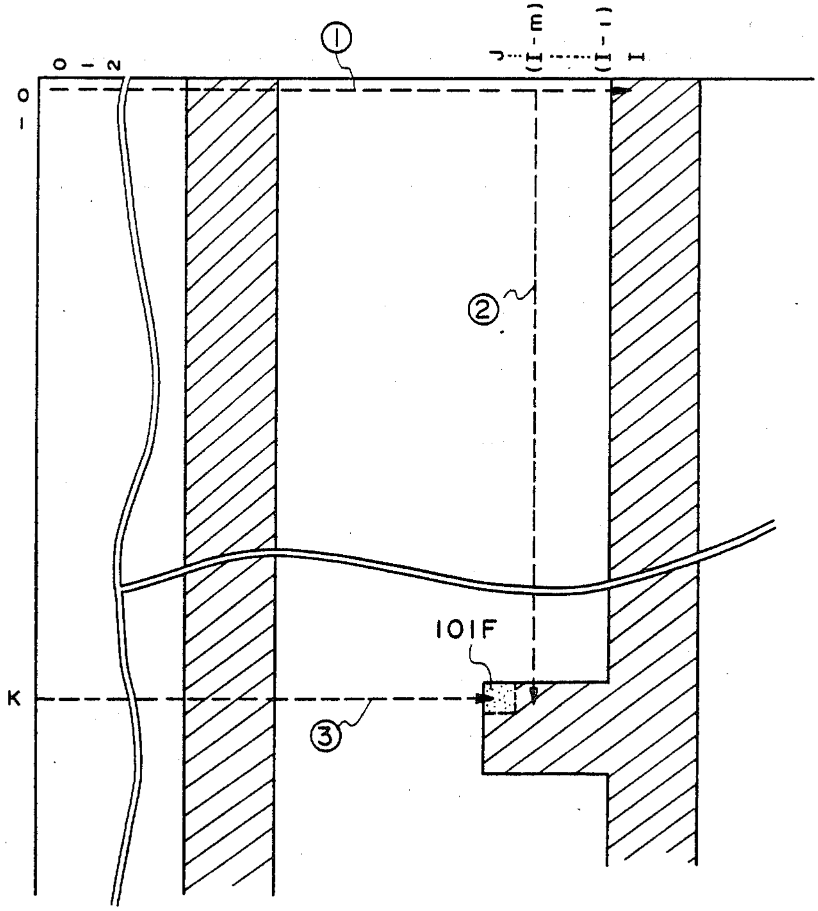

FIG. 6 is an illustration of images picked up in one video frame by the ITV camera 102 and stored in the video image memory. Designated in FIG. 6 at 101$a'$ is a bucket image, 101$b'$ chain images, 101$d'$ rail images, 101$e'$ hook images, 101$f'$ slider images, and 107$a'$ an article image. Where one video frame is composed of 128×256 pixels, the video image memory has a storage area comprising a matrix of 128×256 bytes with the address of any storage location in the video image memory being expressed by 16 bits. Lower 8 bits of the 16 bits are indicative of a horizontal position, and upper 8 bits thereof are indicative of a vertical position. The address of a storage location where the black/white level of a pixel positioned at the Nth line and Mth row is will hereinafter be expressed as A(N, M). The chain images 101$b'$ and the rail images 101$d'$ are always displayed at fixed locations in the video image frame irrespective of the position in which the buckets are attached, the timing at which images are picked up, and other factors. According to the present invention, a distal end 101F (FIG. 7) of the slider image 101$f'$ is determined by reading the addresses in the video image memory in the order of the numbered dotted lines as shown at an enlarged scale in FIG. 7, and determining the black/white levels of the pixels thus read out. More specifically, the contents of the addresses A(0, 0), A(0, 1), A(0, 2) in the video image memory are successively read out and their black/white levels are determined until an address A(0, I) is found which is the second address with the pixel turned from the white level to the black level, as indicated by the dotted line 1 in FIG. 7.

Then, the black/white levels of pixels on the (I−m)th row (m is a constant of 1 or more) are determined. The addresses of the pixels on the (I−M)th row are expressed by A(j, I−m) (j=0, 1, 2, 3 . . . ), and the contents of the addresses A(0, I−m), A(1, I−m), A(2, I−m) . . . are successively read out and determined for their black/white levels. Assuming that the first address having its pixel turned from the white level to the black level is indicated by A(K, I−m), K is representative of your Y-coordinate Ys of the distal end 101F of the slider image. The above process takes place along the dotted line 2 of FIG. 7.

Thereafter, the black/white levels of the pixels on the Kth line are determined. The addresses of the pixels on the Kth line are expressed by A(K, i) (i=0, 1, 2, 3 . . . ), and the contents of the addresses A(I, 0), A(K, 1), A(K, 2) . . . are successively read out and determined for their black/white levels. Assuming that the second address having its pixel turned from the white level to the black level is indicated by A(K, J), J is reprentative of the X-coordinate Xs of the distal end 101F of the slider image. The above process takes place along the dotted line 3 of FIG. 7.

After the coordinates (Xs, Ys) of the distal end of the slider have been found, the stored reference position (Xr, Yr) for the slider and the stored reference position (Xmr, Ymr) for the mask boundary corner are employed to effect the arithmetic operations according to the equations (2) and (3). The coordinates (Xms, Yms) of the upper left corner of the mask boundary line MB are therefore determined.

Suppose the number of pixels is indicated by LX in the horizontal direction and LY in the vertical direction, and the addresses corresponding to the unmasked region MA are as follows:

$$\left.\begin{array}{l} A(Xms,\ Yms),\ A(Xms,\ Yms+1)\ldots \\ AXms(Yms,\ Yms+LX-1) \\ A(Xms+1,\ Yms),\ A(Xms+1,\ Yms+1)\ldots \\ A(Xms+1,\ Yms+LX-1) \\ \vdots \\ A(Xms+LY-1,\ Yms),\ A(Xms+LY-1, \\ Yms+1)\ldots A(Xms+LY-1,\ Yms+LX-1) \end{array}\right\} \quad (4)$$

Accordingly, the size SQR of the article can be expressed by the equation (1) by successively reading the stored contents of the LX and LY addresses, determining the black/white levels thereof, and equalizing Be with the number of black levels and Pe with LX.LY.

While in the foregoing description the distal end of the slider 101$f$ has been regarded as the reference position, the invention is not limited to the illustrated embodiment, but other modifications may be made. As an example, the distal end of the hook 101$e$ may serve as the reference position. In the above embodiment, a piece of dirt attached to the bucket is not stored in the memory as a black level. In case an attached piece of dirt is stored in the memory as a black level, processing should be made with the thickness of the chain images 101$b'$, rail images 101$d'$, and the slider image 101$f'$.

Figure 8:
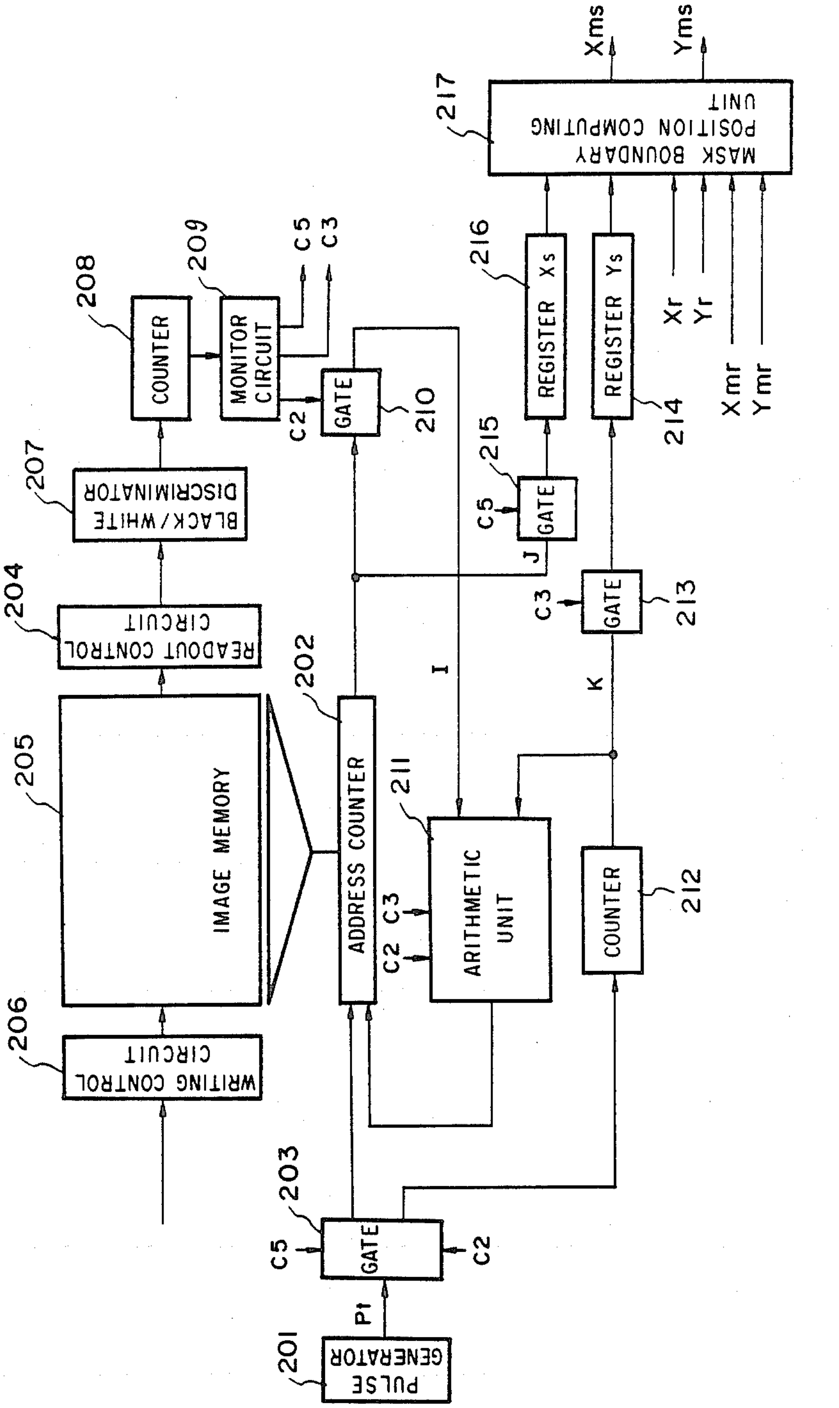
FIG. 8 is a block diagram of a circuit for computing an actual mask boundary line.

FIG. 8 is a block diagram of an arrangement for computing an actual mask boundary line MB. An address counter 202 counts timing pulses Pt entered from a pulse generator 201 through a gate 203. The address counter 202 is a 16-bit counter with lower 8 bits indicating a horizontal position and upper 8 bits indicating a vertical position. Thus, the address counter 202 generates addresses A(0, 0), A(0, 1), . . . A(0, 127), A(1, 0), A(1, 1), . . . A(1, 127), A(2, 0), . . . in response to timing pulses, respectivley, applied thereto. A readout control circuit 204 successively reads out the contents of the addresses A(0, 0), A(0, 1), A(0, 2), . . . in an image memory 205. Designated at 206 is a writing control circuit. The contents of the addresses as thus read out, are delivered to a black/white discriminator 207. When there is a change from a white level to a black level, a counter 208 counts up its count. A monitor circuit 209 monitors the content of the counter 208, and generates a signal C2 when the count in the counter 208 becomes 2. A gate 210 is opened by the signal C2 to allow the value I of the lower 8 bits in the address counter 202 to be entered into an arithmetic unit 211. After the signal C2 has been generated, timing pulses Pt generated by the pulse generator 201 are applied via the gate 203 to a counter 212. The arithmetic unit 211 generates an address A(j, I−m) (j=0, 1, 2, . . . , equal to the count in the counter 212) in the (I−m)th row each time the content of the counter 212 is counted up. As a result, the black/white level of each pixel forming the (I−m)th row is read out and determined by the black/white discriminator 207. When the level changes from white to black, the counter 208 counts up its content to 3. When the count of the counter 208 becomes 3, the monitor circuit 209 produces a signal C3 applied to a gate 213 that allows the content K of the counter 212 to be stored as an Y-axis direction Ys in a register 214. The content K of the counter 212 is also entered into the arithmetic unit 211. In response to the signal C3, the arithmetic unit 211 generates addresses A(K, 0), A(K, 1), A(K, 2), . . . in order to read out the pixels on the Kth line. The black/white levels of the pixels on the Kth line are successively read out, and are determined by the black/white discriminator 207. When the level changes twice from white to black and the total count in the counter 208 becomes 5, the monitor circuit 209 generates a signal C5. The content J of the lower 8 bits in the address counter 202 is allowed to pass through a gate 215 to a register 216 in which the content J is stored as an X-axis position Xs. With Xs, Ys determined, a mask boundary position computing unit 217 effects arithmetic operations expressed by the equations (2), (3) to specify an actual mask boundary position.

Figure 9:
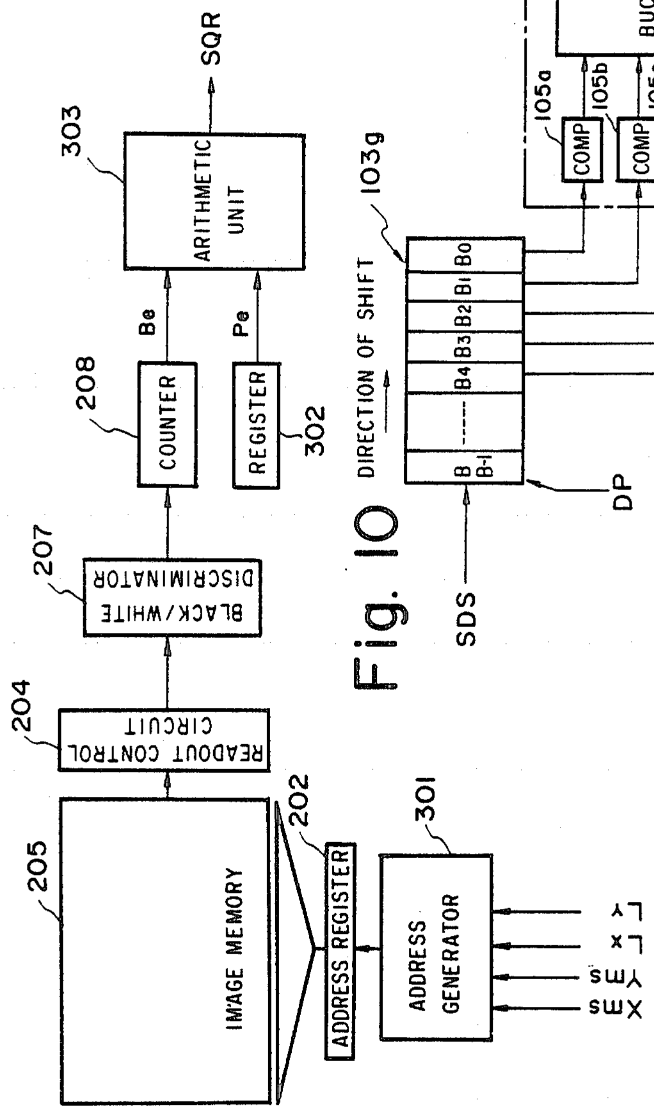
FIG. 9 is a block diagram of an area computing unit.

Referring back to FIG. 2, the area computing unit 103*d* serves to calculate the area SQR of an article based on the total number of pixels in an unmasked portion and the number of black levels in the unmasked portion. FIG. 9 shows in block form the area computing unit 103*d*. Like or identical parts shown in FIG. 9 are denoted by like or identical reference characters in FIG. 8. When an actual mask boundary position is determined by the mask controller 103*c*, its coordinate position (Xms, Yms) is applied to an address generator 301. Since the address generator 301 is also supplied with the size LX, LY of the unmasked portion, the address generator 301 now successively produces addresses of the unmasked portion as set forth at (4) above. The contents of the addresses thus read out are determined for its black/white level by the black/white discriminator 207. When the content of an address is determined as having a black level, the black/white discriminator 207 issues a signal "1" over its output line to count up the content of the counter 208 by +1. Each time a black level is read out, the content of the counter 208 is counted up until it eventually is equal to Be. The total number Pe of pixels (stored in a register 302) in the unmasked portion and the number of black levels (pixels of the article), are applied to an arithmetic unit 303 which performs the arithmetic operation defined by the equation (1) to determine the proportion SQR of the size of the article to the size of the unmasked portion.

In FIG. 2, the grade setting unit 103*e* serves to set a range of sizes of articles. With article size grades determined as "extra-large", "large", "medium" and "small", the grade setting unit 103 has digital switches for setting a boundary value LL12 between the "extra-large" and "large" sizes, a boundary value LH between the "large" and "medium" sizes, and a boundary value MS between the "medium" and "small" sizes, corresponding to their percentages (%) of an unmasked portion. A register stores the boundary values thus set. The grade discriminator 103*f* determines which grade "extra-large", "large", "medium"or "small", the size of an article (as issued from the area computing unit 103*d*) belongs to, and issues a selection signal SDS indicative of the determined grade. This grade determination operation is performed by comparing the boundary values LL12, LM, MS, as set up by the grade discriminator 103*e*, with the size SQR of the article.

If the total number of buckets is B, then the shift register 103*g* has B positions arranged in the direction of shift. The shift register 103*g* shifts its content one position at a time, in parallel, in synchronism with sorting synchronous pulses DP generated by the synchronous signal generator 103*b*. Each position in the shift register 103*g* is composed of 4 bits and corresponds to a prescribed position in the conveyor mechanism 101 (FIG. 1). The positions in the shift register 103*g* store selection signals ("extra-large", "large", "medium", "small", "nonstandard") for articles held in buckets 101*a* located in corresponding relation to the positions in the shift register 103*g*. The lowest position (first position) B0 in the shift register 103*g* corresponds to the nonstandard-article discharging position PBA, the second position B1 to the small-article discharging position PS, the third position B2 to the medium-article discharging position PM, the fourth position B3 to the large-article discharging position PL2, and the fifth position B4 to the extra-large-article discharging position PL1.

Figure 10:
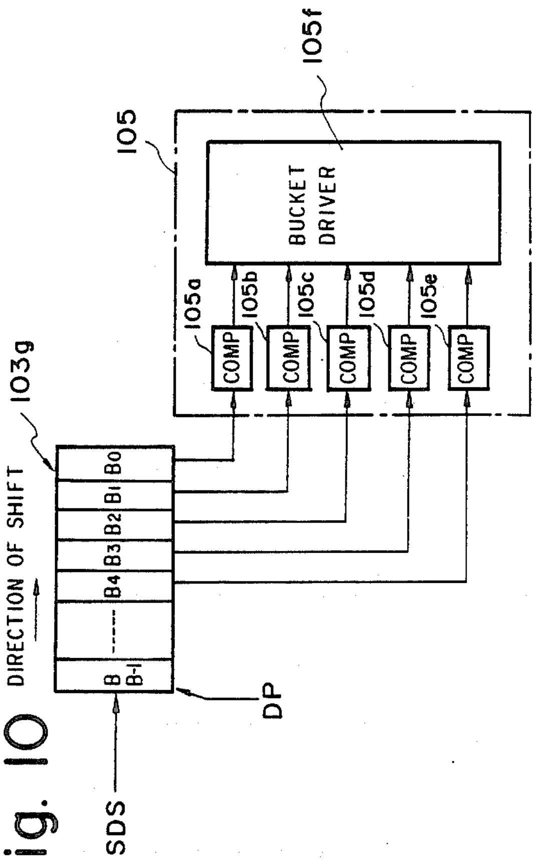
FIG. 10 is a block diagram of a shift register and a bucket controller which are coupled with each other.

As shown in FIG. 10, the bucket controller 105 comprises five comparators 105*a* through 105*e* corresponding respectively to the lower positions B0 through B4 in the shift register 103*g*, and a bucket driver 105*f*. The comparator 105*a* compares the selection information stored in the first position B0 with a code indicative of a nonstandard article, and the comparator 105*b* compares the selection information stored in the second position B1 with a code indicative of a small article. Likewise, the comparators 105*c*, 105*d*, 105*e* compare the selection information stored in the third, fourth and fifth positions B2, B3, B4 respectively with codes indicative of medium, large, and extra-large articles, respectively. The comparators 105*a* through 105*e* issue the results of comparison to the bucket driver 105*f*. The bucket driver 105*f* is responsive to the signals from the comparators 105*a*–105*e* for opening or closing buckets. As an example, when a coincidence signal is issued from the comparator 105*c*, the bucket driver 105*f* opens the bucket in the medium-article discharging position, and when no coincidence signal is generated by the comparator 105*c*, the bucket driver 105*f* does not open the bucket in the medium-article discharging position.

The automatic article sorting operation according to the present invention is effected through successive steps as follows: (1) The article placed in a bucket is imaged by the ITV camera, and the picked-up image is stored in the video image memory. (2) The other area besides the necessary image (i.e., the article image), is masked, and the mask position is corrected if necessary. (3) The number of pixels on the article is counted, and the counted pixel number is utilized to determine the area of the article as the percentage thereof to the area of an unmasked portion. (4) It is determined which preset grade "extra-large", "large", "medium", or "small" the actual area of the article falls in. (5) The result of grade determination (selection information) is stored in the shift register having the same number of positions as the number of buckets. (6) It is determined whether the selection information stored in the shift register positions corresponding to the positions for discharging "extra-large", "large", "medium", "small", and "nonstandard" articles coincides with the extra-large article code, the large article code, the medium article code, the small article code, and the nonstandard code. (7) Buckets are controlled as a result of such code determination to discharge and sort out articles according to their sizes.

The present invention thus provides an automatic article sorting apparatus for determining the sizes of articles such as vegetables or fruits and sorting them out by their sizes. With the apparatus of the invention, the efficiency of sorting operation is improved, an increase in the cost due to the personnel expenses is held to a minimum, and articles can be sorted out in a uniform, standardized fashion.

While in the illustrated embodiment the apparatus is composed of single-purpose hardware devices, it may comprise a microcomputer.

A method of setting article grades in the automatic article sorting apparatus of the foregoing embodiment will now be described.

Figure 11:
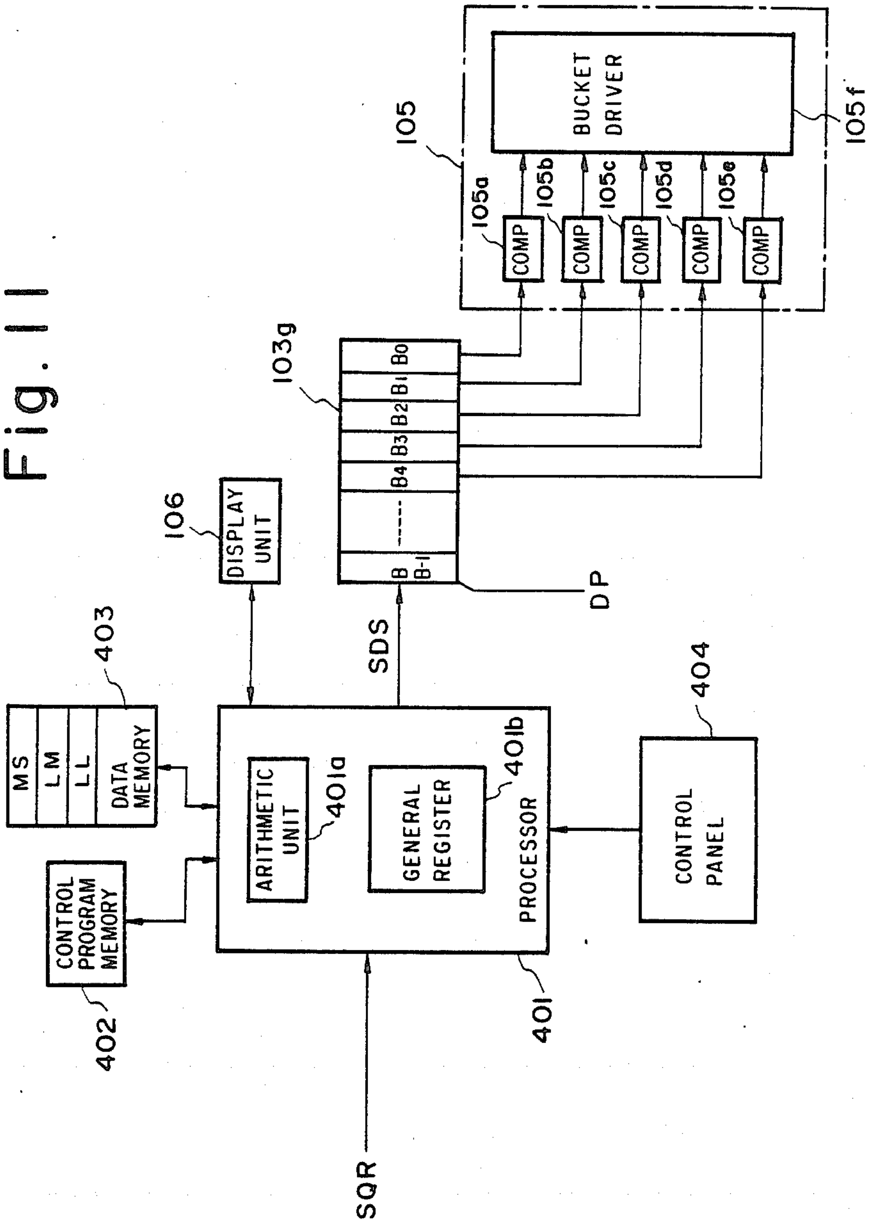
FIG. 11 is a block diagram of a grade setting unit and a grade discriminator.

FIG. 11 is a block diagram of a microcomputer for implementing the grade setting unit 103*e* and the grade discriminator 103*f* shown in FIG. 1. The microcomputer comprises a processer 401 having an arithmetic unit 401*a* and a general register 401*b*, a control program memory 402 for storing a control program for controlling the process of grade setting and grade discriminating operations, a data memory 403 for storing grade values LL, LM, MS, and a control panel 404. The control panel 404 has a mode switch for selecting a sorting mode or a grade value setting mode, a grade value indication switch for specifying a particular grade value in the grade value setting mode, and a setting switch for storing the specified grade value in the data memory 403. Designated at 106 is a display unit 106 for displaying the result of grade determination, at 103*g* a shift register, and at 105 a bucket driver.

In operation, the mode switch and the grade value indication switch on the control panel 404 are operated to enter a desired grade value and the grade value setting mode into the processor 401. Then, articles having sizes in the vicinity of predetermined grade values are placed in N (an integer of 1 or greater) buckets 101*a* of the conveyor mechanism 101 (FIG. 1) and transported thereby. The area of the article in each bucket is computed by the image processor 103*a*, the masking controller 103*c* and the area computing unit 103*d*, and is entered into the processor 401. The processer 401 operates under the control of the control program to store the total sum of areas SQRi that are successively entered into the general register 401*b*, and to count and store the total number N also into the register 401*b*. Under this condition, the setting switch on the control panel 404 is actuated to enable the processor 401 to compute a grade value K through an arithmetic operation defined by the equation:

$$K=SQRi/N$$

and store the determined grade value K into the data memory 403. Likewise, the boundary values (grade values) MS, LM, LL between "small" and "medium" articles, between "medium" and "large" articles, and between "large" and "extra-large"articles are computed and stored in the data memory 403.

After the grade value has been set, the mode switch is actuated to select the sorting mode. The processor 401 now compares an area value SQR with the preset boundary values MS, LM, LL each time such an area value SQR is entered, to judge the size of each article as "extra-large", "large", "medium" or "small". The result of such size determination is displayed on the display unit 106, and selection information SDS is delivered to the shift register 103*g*.

With the foregoing arrangement, the area of an article having a size in the vicinity of a particular boundary can be measured using the function inherent in the automatic article sorting apparatus, and the measured area, or the mean value of areas of plural articles thus measured, can be set up as a boundary value. This process makes it unnecessary to measure the area of an article separately and set the article area through a manual switch, so that grade setting can be effected simply in a short period of time.

A method of computing the area and number of an article in the automatic article sorting apparatus will now be described.

Figures 12, 13:
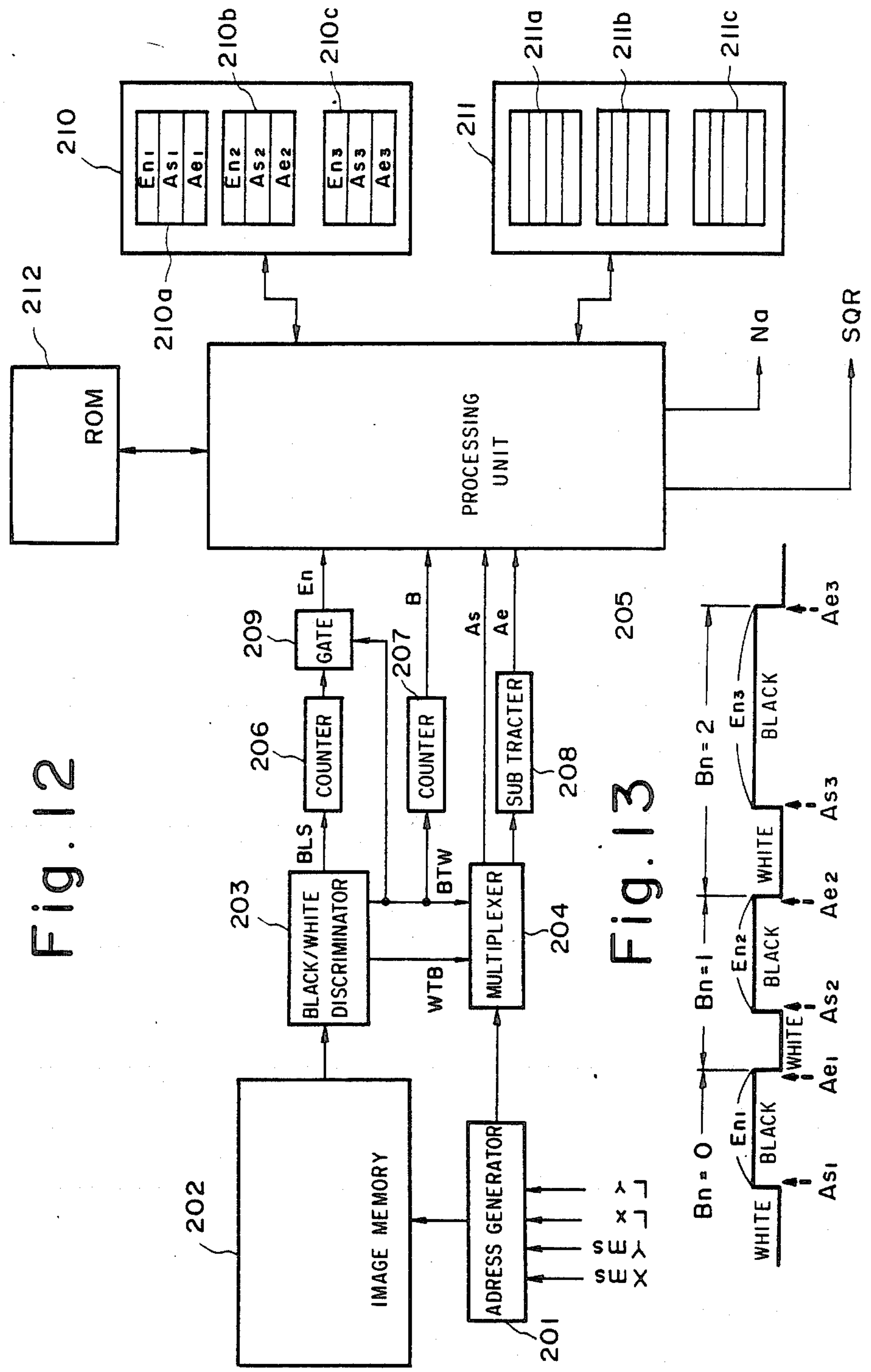
FIG. 12 is a block diagram of an area and number computing unit.
FIG. 13 is a schematic view showing an image obtained by one-line scanning.

The area computing unit 103*d* shown in FIG. 2 serves to compute the area SQR of an article from the total number of pixels in an unmasked portion and the number of black levels in the unmasked portion, and to compute the number of an article or articles in a single bucket by ascertaining whether an article image is continuous or not. FIG. 12 is a block diagram of the area computing unit.

When an actual mask boundary position is determined in the masking controller 103*c*, the position Xms, Yms is applied to an address generator 201. Since the size LX, LY of the unmasked portion is also applied to the address generator 201, the latter generates a succession of unmasked portion addresses as indicated by equation (4) above. The black/white levels of the pixels constituting the image are read out of the image memory 202 by raster scanning and are applied to a black/white discriminator 203. The black/white discriminator 203 discriminates the signals read out of the image memory 202, and issues a signal WTB indicative of a change from the white to the black level, a signal BTW indicative of a change from the black to the white level, and a signal BLS indicative of the black level. When the signal WTB is generated, a multiplexer 204 enters an address As at that time into a processing unit 205. When the black signal BLS is generated, the counter 206 counts up its content to count the number of black-level pixels. When the signal BTW is produced, the counter 207 counts up its content, and a multiplexer 204 enters an address at that time into a subtracter 208, and a gate 209 allows the number En of continuous black-level pixels, as it is counted by the counter 206, to be entered into the processing unit 205. The subtracter 208 subtracts 1 from the address which has changed from black to white and enters the result into the processing unit 205. The counter 207 enters its count Bn into the processing unit 205.

FIG. 13 shows an example in which the image changes from the white to the black level at addresses As1, As2, As3, and changes from the black to the white level at addresses (Ae1+1), (Ae2+1), (Ae3+1), and the numbers of pixels in the black-level portions are En1, En2, En3. Operation of the processing unit 205 in such a situation will be described. The count Bn in the counter 207 is zero at an initial stage. When the signals WTB, BTW are produced to enter the addresses As1, Ae1 and the pixel number En1 successively into the processing unit 205, the latter stores the data As1, Ae1, En1 at a first storage region 210*a* in a memory 210 as Bn=0. The count Bn becomes 1 when the signal BTW is generated. When the second signals WTB, BTW are produced, the addresses As2, Ae2 and the pixel number En2 are entered successively into the processing unit 205, the latter stores the data As2, Ae2, En2 at a second storage region 210*b* in the memory 210 as Bn=1. Likewise, the addresses As3, Ae3 and the pixel number En3 are stored at a third storage region 210*c*. When scanning on the current scanning line is completed, the processing unit 205 operates under the control of the control program stored in a ROM 212 for computing the article area and number based on the result of previous scanning stored in a memory 211 and the content stored in the memory 210.

Figure 14:
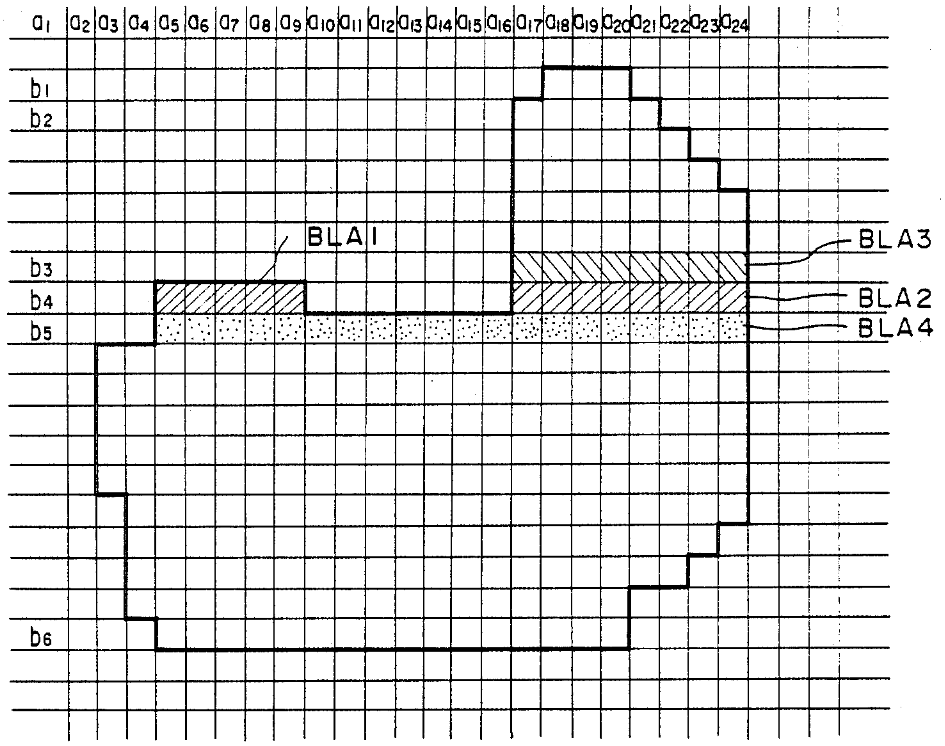
FIGS. 14 through 16 are diagrams for explaining area and number computation processing effected by a processor.
Figure 16:
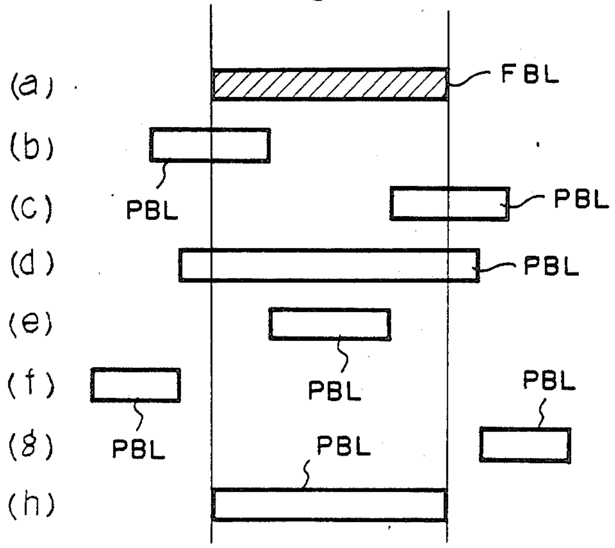
Figure 15:
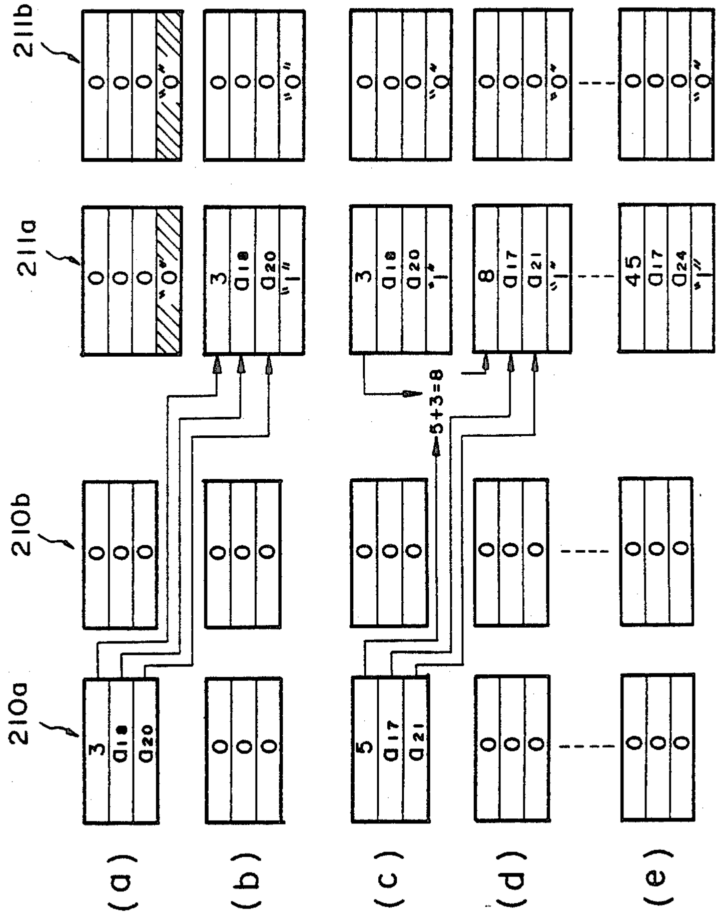

FIGS. 14 through 16 are illustrative of a processing operation for computing the article area and number with the processing unit 205. FIG. 14 shows an image as stored in the image memory 202. FIG. 15 illustrates the manner in which the stored contents of the storage regions in the memories 210, 211 (FIG. 12) vary as the processing progresses. FIG. 16 is illustrative of a method of determining whether a black-level portion in a preceding scanning step is contiguous to a black-level portion in a current scanning step.

In FIG. 14, when scanning along a scanning line b1 is finished, a position a18 in which a black level started, a position a20 in which the black level ended, and the number of pixels, 3, are stored in the first storage region 210*a* in the memory 210 as shown in FIG. 15(*a*). Then, the processing unit 205 ascertains whether the black-level portion written in the first storage region 210*a* is contiguous to a black-level portion stored in the memory 211 in a previous scanning step. In the illustrated embodiment, there is no preceding black-level portion, and hence the processing unit 205 transfers stored data in the first storage region 210*a* in the memory 210 to a first storage region 211*a* in the memory 211, and at the same time clears the stored content of the first storage region 210*a*, as illustrated in FIG. 15(*b*). Each storage region 211*a*, 211*b* in the memory 211 has a fourth storage location (shown hatched) for storing a flag which is "1" when information is written or set in the associated storage region and "0" when information is not written or cleared in the associated storage region.

Upon completion of scanning along a next scanning line b2, a black-level starting position a17, a black-level ending position a21, and a pixel number 5 are stored in the first storage region 210*a* in the memory 210, as shown in FIG. 15(*c*). Thereafter, the processing unit 205 determines whether the black-level portion written in the first storage region 210*a* is contiguous to the black-level portion in the preceding scanning step (stored in the first storage region 211*a* in the memory 211). The black-level portions are interpreted as being contiguous to each other when a black-level portion PBL in the current scanning step is related to a black-level portion FBL (FIG. 16(*a*)) in the preceding scanning step in the patterns as shown in FIGS. 16(*b*)-(*e*) and (*h*), and as being disconnected from each other when the black-level portion in the current scanning step is related to the black-level portion FBL as illustrated in the patterns of FIGS. 16(*f*) and (*g*). Determination of the relationship between the current black-level portion PBL and the preceding black-level portion FBL to find the relative pattern as shown in FIG. 16(*b*)-(*h*) is effected by comparing the magnitudes of the black-level starting and ending positions. In the example shown in FIG. 14, the black-level portions in the preceding and current scanning steps have the relationship of FIGS. 16(*a*) and (*d*), and hence are judged as being connected with each other.

Then, the total number of pixels in the connected black-level portions is found by adding the pixel number 5 stored in the first storage region 210*a* and the pixel number 3 stored in the first storage region 211*a*. The sum 8 and the black-level starting and ending positions a17, a21 on the current scanning line are stored in the first storage region 211*a* in the memory 211 by renewing the previous data stored therein, as shown in FIG. 15(*d*). This process is called a "continuation process".

Thereafter, this process is repeated until scanning along a scanning line b3 is finished whereupon the memories 210, 211 store data as shown in FIG. 15(*e*).

After a line b4 has been scanned, the first storage region 210*a* in the memory 210 stores a position a5 in which a first black-level portion BLA1 started, a position a9 in which the first black-level position BLA1 ended, and a pixel number 5, and the second region 210*b* in the memory 210 stores a position a17 in which a second black-level portion BLA2 started, a position a24 in which the second black-level position BLA2 ended, and a pixel number 8, as illustrated in FIG. 15(*f*). Then, the processing unit 205 determines whether the first and second black-level portions BLA1, BLA2 are contiguous to a black-level portion BLA3 in the preceding scanning step. Since the first black-level portion BLA1 and the preceding black-level portion BLA3 are related to each other as illustrated in FIGS. 16(*a*) and (*f*), they are discontinuous and the data stored in the first storage region 210*a* in the memory 210 are transferred to the second storage region 211*b* in the memory 211, as shown in FIG. 15(*g*). This process is called a "discontinuation process".

The second black-level portion BLA2 and the preceding black-level portion BLA3 are of the mutual relationship as shown in FIGS. 16(*a*) and (*h*), and hence are contiguous to each other. Therefore, the continuation process is carried out as shown in FIG. 15(*h*).

When scanning is finished along a scanning line b5, the first storage region 210*a* in the memory 210 stores positions a5, a24 in which a black-level portion BLA4 started and ended, respectively, and a pixel number 20, as shown in FIG. 15(*i*). Subsequently, the processing unit 205 ascertains whether the black-level portion BLA4 is in a continuous relationship to the first and second black-level portions BLA1, BLA2 on the preceding scanning line. Since the black-level portion BLA4 is contiguous to the first black-level portion BLA1 with the patterns of FIGS. 16(*a*) and (*d*), the continuation process is effected as illustrated in FIG. 15(*j*).

The black-level portion BLA4 is also contiguous to the second black-level portion BLA2 in the relationship of FIG. 16(*a*) and (*d*). The continuation process has already been performed between the black-level portions BLA4, BLA1, and there is effected another continuation process in which the sum of the pixel numbers stored in the first and second storage regions 211*a*, 211*b* in the memory 211 is determined. Then, the pixel number stored in the first storage region 211*a* is renewed by the sum found and the data stored in the second storage region 211*b* are cleared, as shown in FIG. 15(*k*).

Thereafter, this process is repeated until processing is completed upon scanning along a scanning line b6, whereupon a flag of "1" is set in the first storage region 211*a* in the memory 211, and the total pixel number is 281. The arithmetic operation by the equation (1) is effected using the total pixel number 281 to find the area SQR. The number of storage regions in which the flag "1" is set is regarded as the number of articles, and here the number of articles is 1.

Figure 17:
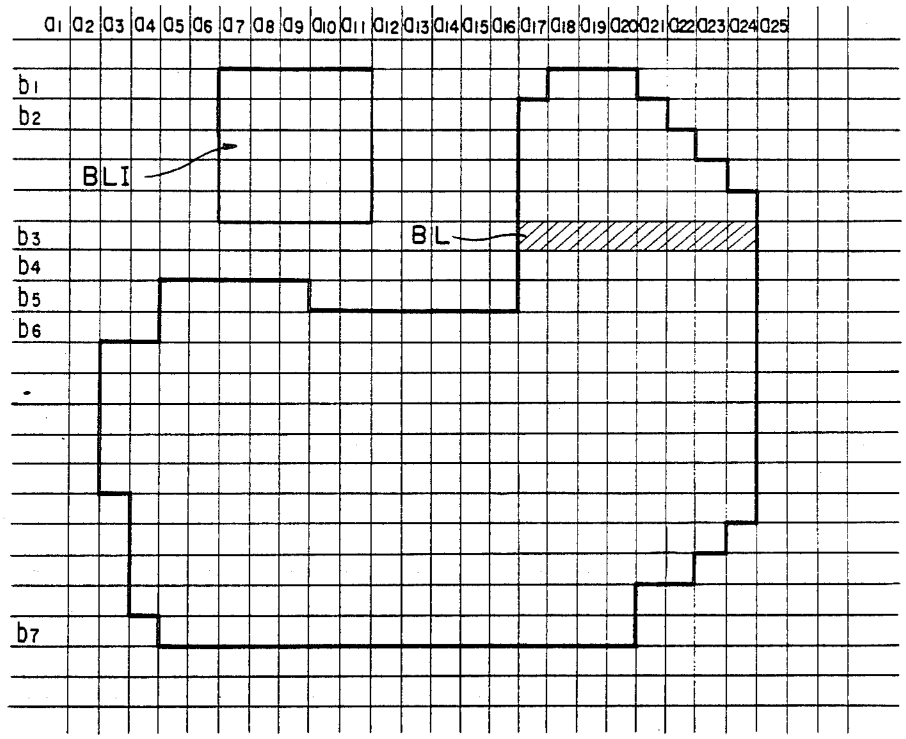
FIGS. 17 and 18 are diagrams for explaining area and number computation processing carried out by a processor when there are two articles.
Figure 18:
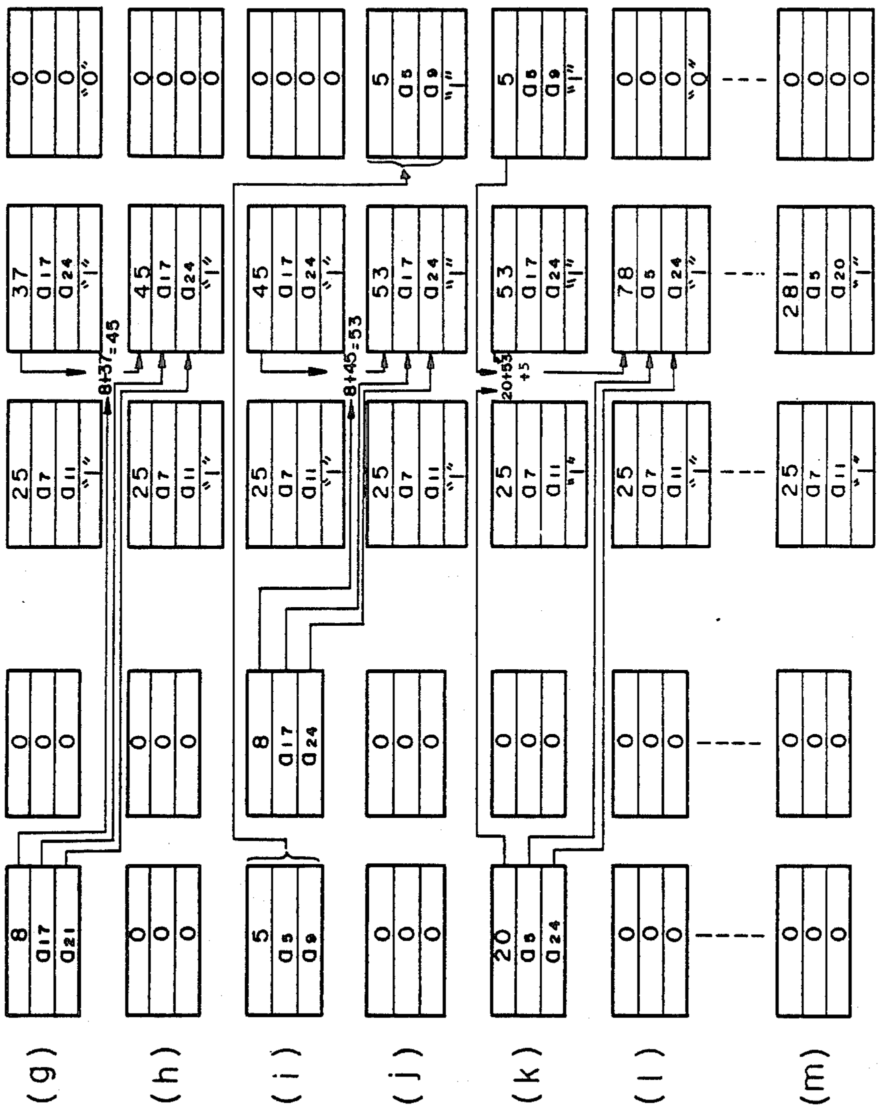

FIGS. 17 and 18 are illustrative of a process of computing the area and number of two articles. FIG. 17 shows an image as stored in the image memory, and FIG. 18 illustrates the manner in which the contents of the storage regions in the memories 210, 211 (FIG. 12) are altered as the processing advances. FIG. 18(*a*) shows the contents of the storage regions 210*a*, 210*b* in the memory 210 and the storage regions 211*a*, 211*b*, 211*c* in the memory 211 after scanning along a scanning line b1. FIG. 18(*b*) shows the stored data after area and number computation has been effected on the basis of the stored data shown in FIG. 18(*a*). FIG. 18(*c*) illustrates the stored data subsequent to scanning along a scanning line b2. FIG. 18(*d*) illustrates the stored data after area and number computation has been effected. FIG. 18(*e*) illustrates the stored data subsequent to scanning along a scanning line b3. FIG. 18(*f*) illustrates the stored data after area and number computation has been effected. FIG. 18(*g*) shows the stored data subsequent to scanning along a scanning line b4. FIG. 18(*h*) illustrates the stored data after area and number computation has been effected. A black-level portion BL scanned along the line b3 is disconnected from a preceding black-level portion BLI, and the latter is interpreted as being indicative of a single article. The data stored in the first storage region 211*a* are subsequently not renewed, and will not be processed until the final processing.

FIG. 18(*i*) shows the stored data subsequent to scanning along a scanning line b5. FIG. 18(*j*) is illustrative of the stored data after area and number computation. FIG. 18(*k*) shows the stored data subsequent to scanning along a scanning line b6. FIG. 18(*l*) is illustrative of the stored data after area and number computation. Finally, FIG. 18(*m*) shows the data stored after scanning along a scanning line b7 and computing the area and number.

Since a flag of "1" is set in each of the first and second storage regions 211*a*, 211*b*, the number of articles is 2 and the numbers of pixels of the articles are 25, 281, respectively.

With the foregoing arrangement, the number of articles placed in the buckets and, at the same time, the area of the articles, can be computed. In the event of the presence of two or more articles in one bucket, they are discharged as nonstandard articles.

Two methods of discriminating the shape of an article in the automatic article sorting apparatus will be described. According to a first method, after scanning along the scanning line b5, as shown in FIG. 14, the starting and ending positions a5, a24 for the black-level portion BLA4 and the pixel number 20 are stored in the first storage region 210*a* in the memory 210 as shown in FIG. 15(*i*). Thereafter, the processing unit 205 determines whether the black-level portion BLA4 is contiguous to the first and second black-level portions BLA1, BLA2. In the illustrated example, the black-level portion BLA4 is contiguous to the first and second black-level portions BLA1, BLA2, and the processing unit 205 (FIG. 12) then compares the pixel numbers Pn1 (=53), Pn2 (=52) stored in the first and second storage regions 211*a*, 211*b* in the memory 211 with a preset pixel number Pr. The pixel numbers Pn1, Pn2 are equal to the pixel numbers (areas) in two projections of the article. The preset pixel number Pr is established dependent on the size of the article or on how long or large the projections should be in order to be judged irregular in shape.

Where both of Pn1, Pn2 are found to be larger than Pr through the above comparison, the article is judged large enough to be determined as being irregular in shape, and an irregularity signal is issued.

In case either Pn1 or Pn2 is smaller than Pr, the article projections are not judged irregular in shape, and the following process will be performed: Since the black-level portion BLA4 and the first black-level portion BLA1 are contiguous to each other, the continuation process is performed. The black-level portion BLA4 and the first black-level portion BLA1 are also contiguous to each other. However, no ordinary continuation is effected, but the numbers of pixels stored respectively in the first and second storage regions 211*a*, 211*b* in the memory 211 are added, and the sum is used to renew the pixel number stored in the first storage region 211*a* while at the same time clearing the data stored in the second storage region 211*b*, as illustrated in FIG. 15(*k*).

The similar process is repeated until after data processing based on scanning along a scanning line b6. A flag of "1" is set in the first storage region 211*a* in the memory 211, and the total pixel number is 281. The area SQR is found by carrying out the arithmetic operation expressed by the equation (1) using the pixel number 281. Since the flag "1" is set in storage region 211*a* only, the number of articles N is 1.

Figure 19:
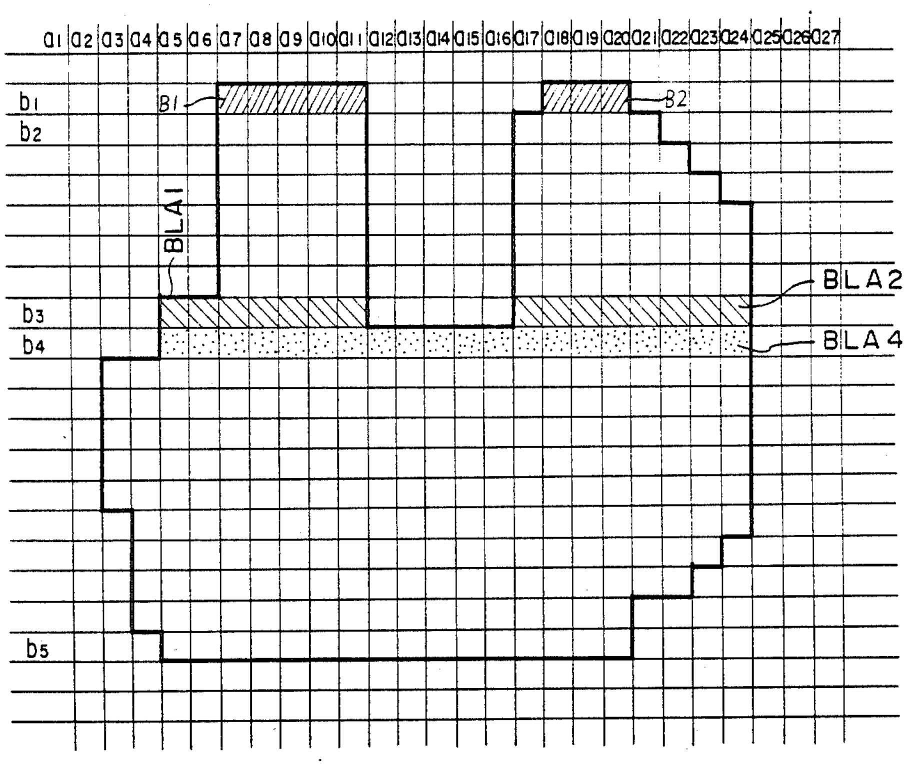
FIGS. 19 and 20 are diagrams for explaining area and number computation processing carried out when an article has a projection.
Figure 20:
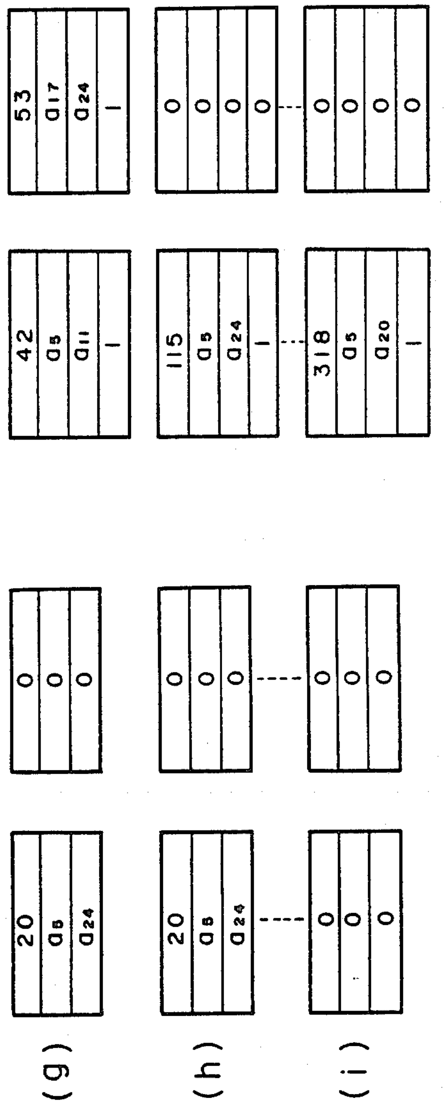

FIGS. 19 and 20 are illustrative of an example of computation of the area and shape of an article having large projections. FIG. 19 shows an image as stored in the image memory, and FIG. 20 shows the manner in which the data stored in memory storage regions in the memories 210, 211 change as the processing goes on.

FIGS. 20(*a*), (*c*), (*e*) and (*g*) shows data stored after scanning along scanning lines b1, b2, b3 and b4, respectively, illustrated in FIG. 19, and FIGS. 20(*b*), (*d*), (*f*) and (*h*) illustrates data stored after the area and number have been computed. FIG. 20(*i*) shows data stored after scanning along a scanning line b5 and associated computation. The article shaped as shown in FIG. 19 has a black-level portion BLA4 on the scanning line b4 connected to first and second black-level portions BLA1, BLA2. Therefore, a process for identifying the article configuration is carried out. More specifically, the numbers of pixels, 42 and 53, are read out of the first and second storage regions 211*a*, 211*b*. If Pr=35, then Pn1>Pr, Pn2>Pr and the processing unit determines that the article is irregularly shaped.

A second method of discriminating the shape of an article in the automatic article sorting apparatus will be described. As shown in FIG. 14, after scanning along the scanning line b4, the starting and ending positions a5, a24 of the black-level portion BLA4 and the number of pixels, 20, are stored in the first storage region 210*a* in the memory 210 (FIG. 15(*g*)). Then, the processing unit 205 (FIG. 12) determines whether the black-level portion BLA4 is contiguous to both of the first and second black-level portions BLA1, BLA2 in the preceding scanning step. The black-level portion BLA4 is actually contiguous to both of the first and second black-level portions BLA1, BLA2, and the processing unit 205 then compares a depth D (=1) stored in a register 211*d* (FIG. 21) with a preset depth Dr. The depth D is expressed by the number of scanning lines. The preset depth is determined dependent on the size of the article or on how deep a recess in the article should be in order to be judged irregular in shape.

If Dr≦D, then the recess in the article is judged deep enough to determine that the article is irregular in shape, and an irregularity signal is issued. If Dr>D, then the article is not judged to be irregular in shape, and the following process will be performed: Since the black-level portion BLA4 and the first black-level portion BLA1 are contiguous to each other, the continuation process is performed. The black-level portion BLA4 and the first black-level portion BLA1 are also contiguous to each other. However, no ordinary continuation is effected, but the numbers of pixels stored respectively in the first and second storage regions 211*a*, 211*b* in the memory 211 are added, and the sum is used to renew the pixel number stored in the first storage region 211*a* while at the same time clearing the data stored in the second storage region 211*b*, as illustrated in FIG. 15(*k*).

This process is repeated until after data processing based on scanning along the scanning line b6. A flag of "1" is set in the first storage region 211*a* in the memory 211, and the total pixel number is 281. The area SQR is found by carrying out the arithmetic operation expressed by the equation (1) using the pixel number 281. Since the flag "1" is set in storage region 211*a* only, the number of articles N is 1. The final determination is therefore that a single article is placed in the bucket, its shape is normal, and the number of pixels is 281.

Figure 21:
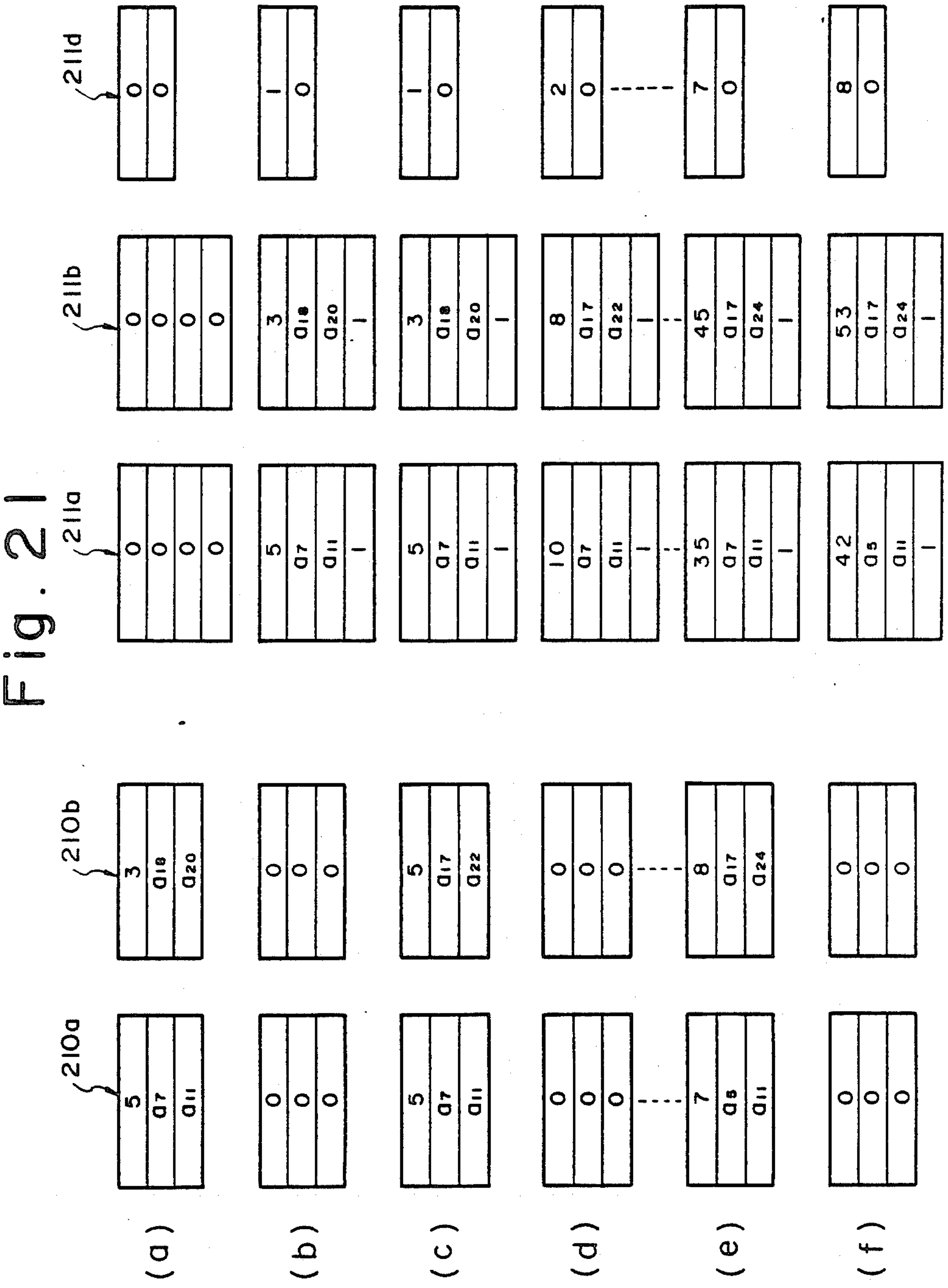
FIG. 21 is a diagram for explaining area and number computation processing performed when an article has a recess.
Figure 15:
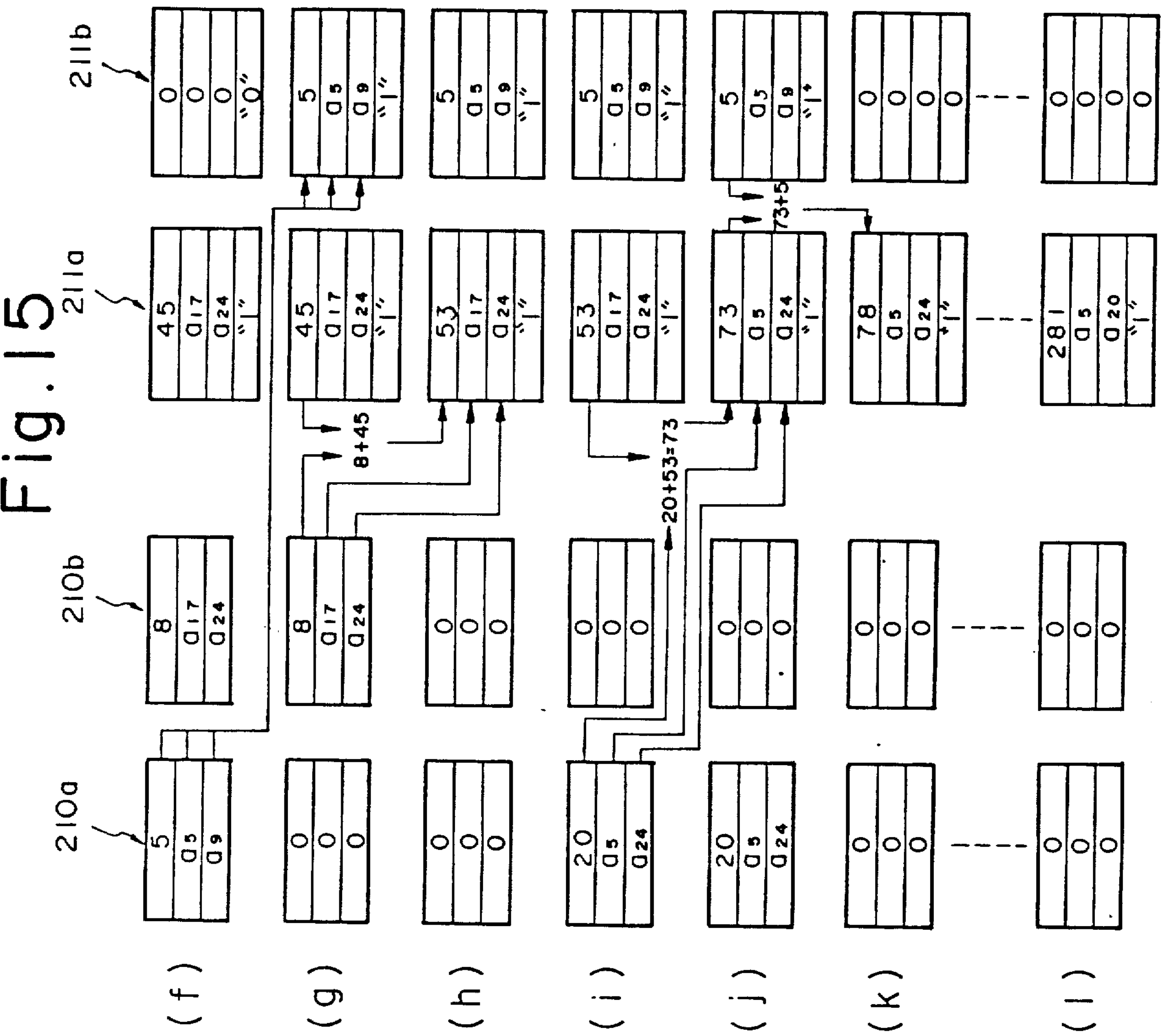
Figure 18:
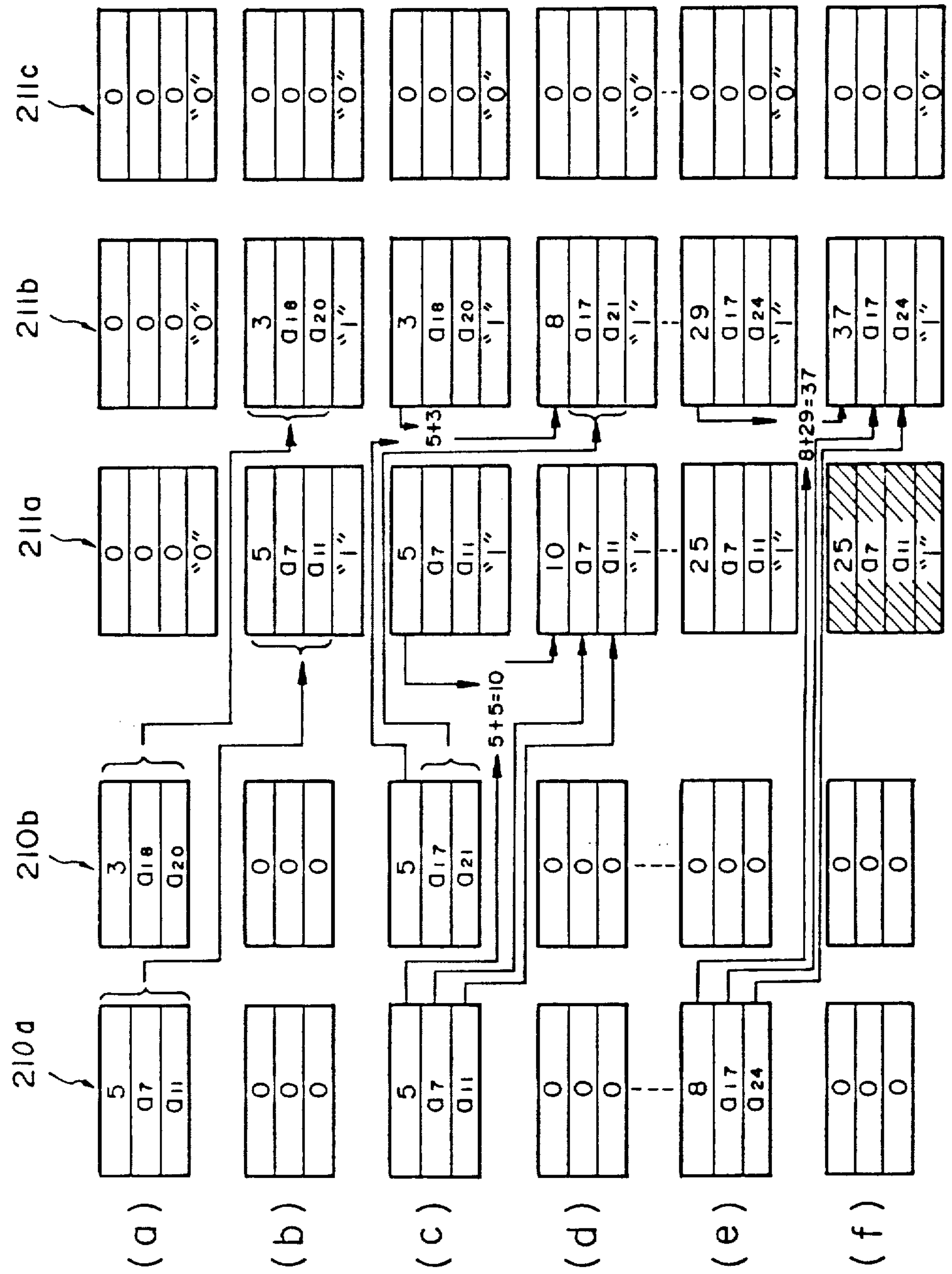
Figure 20:
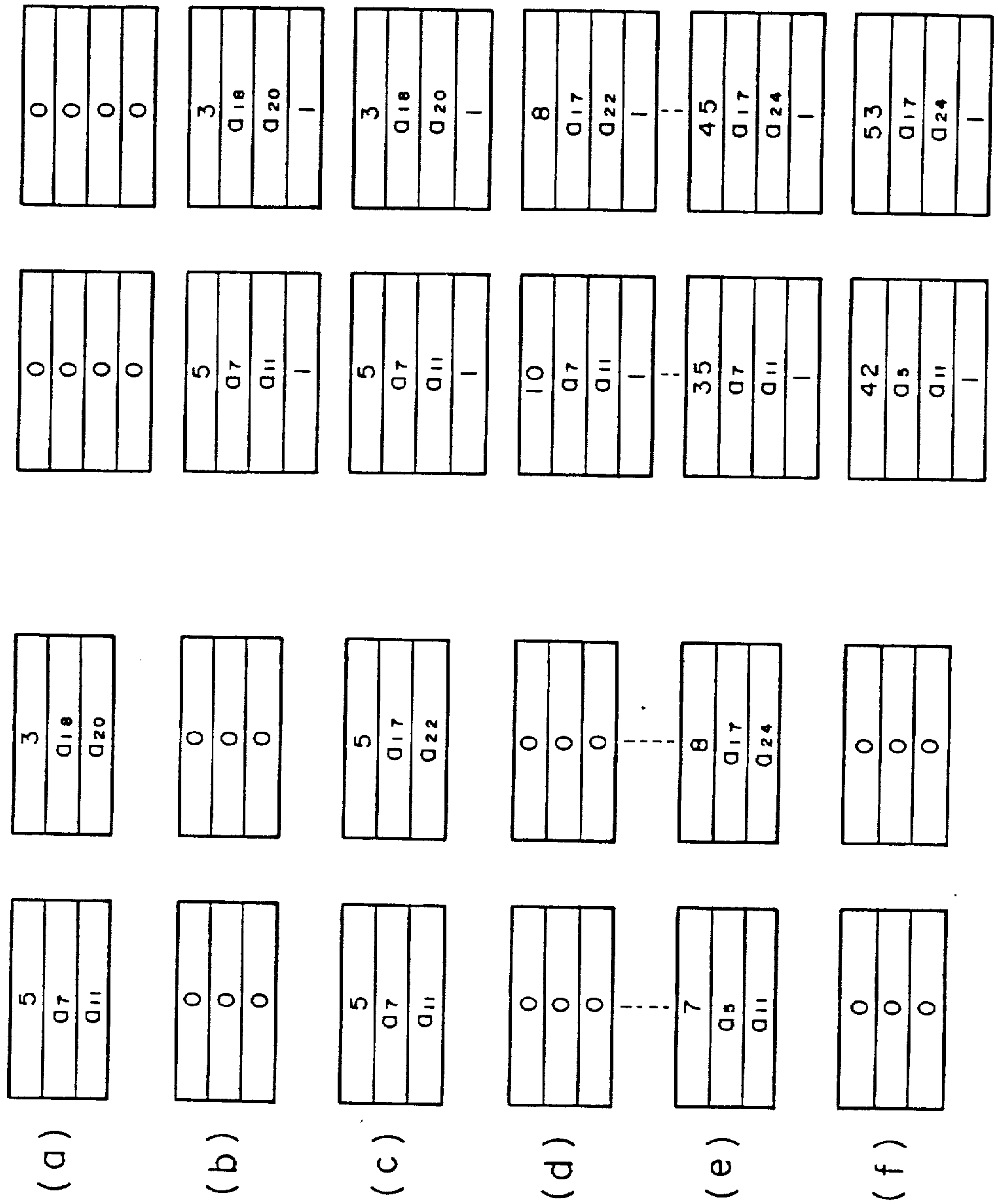
Figure 21:
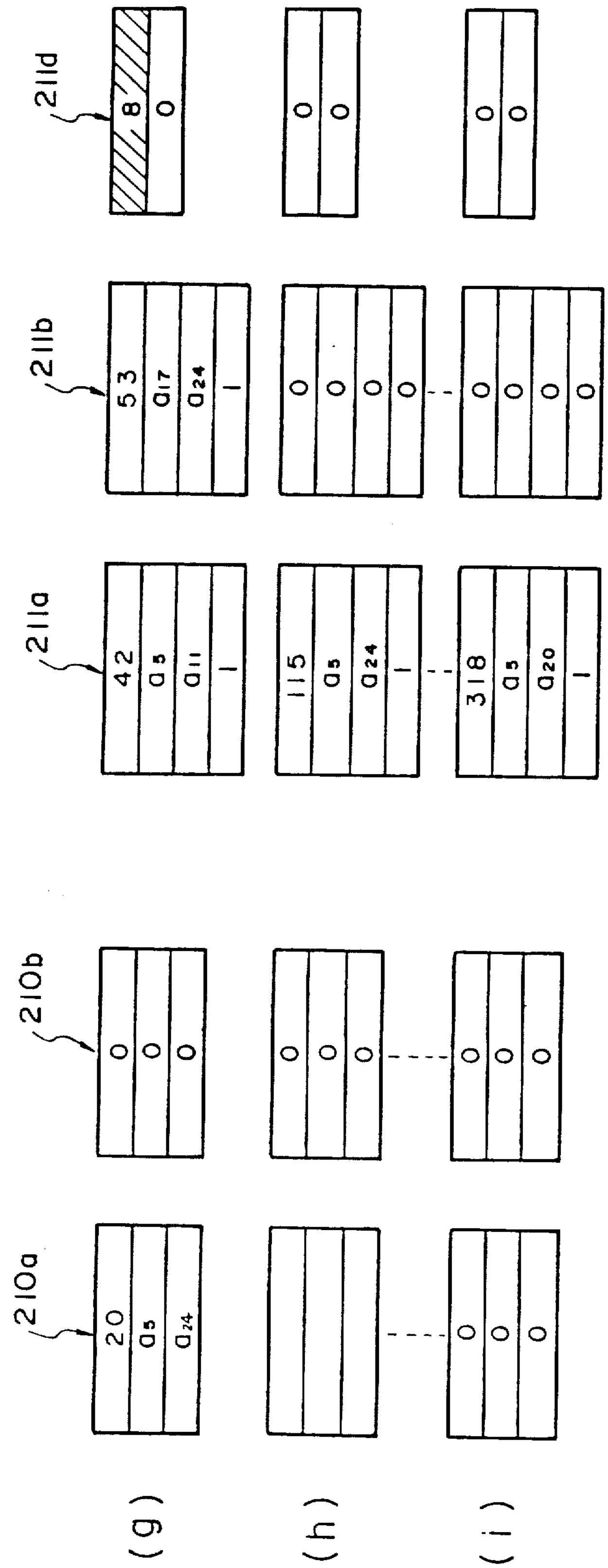

FIGS. 19 and 21 are illustrative of an example of computation of the area and shape of an article having a large recess. FIG. 19 shows an image as stored in the image memory, and FIG. 21 shows the manner in which the data stored in memory storage regions in the memories 210, 211 change as the processing progresses.

FIGS. 21(*a*), (*c*), (*e*) and (*g*) shows data stored after scanning along scanning lines b1, b2, b3 and b4, respectively, illustrated in FIG. 19, and FIGS. 21(*b*), (*d*), (*f*) and (*h*) illustrates data stored after the area and number has been computed. FIG. 21(*i*) shows data stored after scanning along the scanning line b5 and associated computation. The data stored in the first and second storage regions 210*a*, 210*b* in the memory 210 and in the first and second storage region 211*a*, 211*b* in the memory 211 vary in the same manner as that illustrated in FIG. 15, and no detailed description of the data variation will be given.

Black-level portions B1, B2 obtained by scanning along the scanning line b1 are disconnected from each other, and the register 211*d* counts its content up to 1 (FIG. 21(*b*)). Each time the image is scanned along a scanning line to produce a black-level portion, the processing unit determines whether the black-level portion is contiguous to the black-level portions B1, B2. If they are discontinuous, the content of the register 211*d* is counted up by 1. In FIG. 19, the black-level portion BLA4 on the scanning line b4 is contiguous to the black-level portions B1, B2, and the number of lines stored in the register 211*d* up to the arrival at the black-level portion BLA4, that is, the depth D (=8) is compared with the preset reference depth Dr. If $D \geqq Dr$, then the article is determined to be irregular in shape, and if $D < Dr$, then the article is determined to be regular in shape. While in the illustrated example the recess in the article opens upwardly, the depth of a recess opening downwardly can also be determined in substantially the same manner.

With the arrangement of the present invention, therefore, articles of irregular shape can be discriminated and separated from normally shaped articles for being discharged.

Although a certain preferred embodiment has been shown and described, it should be understood that many changes and modifications may be made therein without departing from the scope of the appended claims.

What is claimed is:

1. A method of computing the area and number of articles in an automatic sorting apparatus including an image pickup unit for producing images of the articles, an image memory for storing, as a multiplicity of pixels, the images of the articles one frame at a time, a sorting device for deriving the area of an imaged article from the number of pixels forming the article image and for comparing the area of the imaged article with a preset range of grades to produce selection information indicative of a particular grade to which the article belongs, and means for sorting out the article dependent on the size thereof according to the selection information, said method comprising the steps of:

(a) determining the black/white level of each pixel by raster scanning the pixels forming the image of the article and storing the starting and ending positions of a continuous black-level portion in an ith scanning step;

(b) determining whether a black-level portion in an (i+1)th scanning step is contiguous to the black-level portion in the ith scanning step by employing the stored starting and ending positions;

(c) adding the number of pixels of the black-level portion in the (i+1)th scanning step to the total number of pixels of the black-level portions in scanning steps up to the ith scanning step when the black-level portions in the ith and (i+1)th scanning steps are contiguous to each other, or separately storing the number of pixels of the black-level portion in the (i+1)th scanning step when the black-level portions in the ith and (i+1)th scanning steps are discontinuous from each other; and (d) identifying the number of articles in one frame as being two when black-level portions in all scanning steps following the (i+1)th scanning step are discontinuous from the black-level portions in the ith and (i+1)th scanning steps, or adding the number of pixels of the black-level in a current scanning line to the total number of pixels in the ith and (i+1)th scanning steps when black-level portions in scanning steps following the (i+1)th scanning step and up to the current scanning line are contiguous to the black-level portions in the ith and (i+1)th scanning steps and identifying the number of articles in one frame as one, with the total number of pixels representing the area of the one article.

* * * * *

UNITED STATES PATENT AND TRADEMARK OFFICE
CERTIFICATE OF CORRECTION

PATENT NO. : 4,693,378

DATED : SEPTEMBER 15, 1987

INVENTOR(S) : OSAMU AZEGAMI ET AL.

It is certified that error appears in the above-identified patent and that said Letters Patent is hereby corrected as shown below:

Col. 1, line 13, "pears" should be --pears,--;
line 13, "toes" should be --toes,--.

Col. 6, line 2, "AXms(Yms, Yms + LX-1)" should be --A(Xms, Yms + LX-1)--.

<u>IN THE DRAWINGS</u>

Figure 15, after "(e)", insert --(f)-(1)--.as shown on the attached sheet.

Figure 18, before "(g)", insert --(a)-(f)--. as shown on the attached sheet.

Figure 20, before "(g)", insert --(a)-(f)--. as shown on the attached sheet.

Figure 21, after "(f)", insert --(g)-(i)--. as shown on the attached sheet.

Signed and Sealed this

Fifteenth Day of March, 1988

*Attest:*

DONALD J. QUIGG

*Attesting Officer*

*Commissioner of Patents and Trademarks*

'atent No. 4,693,378

September 15, 1987

Osamu Azegami et al.

Patent No. 4,693,378

September 15, 1987

Osamu Azegami et al.